United States Patent
Tchobanov et al.

(10) Patent No.: US 10,965,146 B2
(45) Date of Patent: Mar. 30, 2021

(54) HIGH-VOLTAGE MOTOR VEHICLE ELECTRICAL SYSTEM

(71) Applicant: Eberspächer catem GmbH & Co. KG, Herxheim (DE)

(72) Inventors: Dimitar Tchobanov, Nuremberg (DE); Markus Billmann, Emskirchen (DE); Eugen Riefert, Karlsruhe (DE); Christof Lausser, Bad Bergzabern (DE); Ulrich Sutter, Landau i.d. Pfalz (DE)

(73) Assignee: Eberspächer catem GmbH & Co. KG

( * ) Notice: Subject to any disclaimer, the term of this patent is extended or adjusted under 35 U.S.C. 154(b) by 427 days.

(21) Appl. No.: 15/710,882

(22) Filed: Sep. 21, 2017

(65) Prior Publication Data

US 2018/0083479 A1    Mar. 22, 2018

(30) Foreign Application Priority Data

Sep. 22, 2016 (DE) .................. 10 2016 218 276.5

(51) Int. Cl.
*H02J 7/14* (2006.01)
*B60L 1/00* (2006.01)
(Continued)

(52) U.S. Cl.
CPC .......... *H02J 7/1423* (2013.01); *B60H 1/2218* (2013.01); *B60L 1/00* (2013.01);
(Continued)

(58) Field of Classification Search
None
See application file for complete search history.

(56) References Cited

U.S. PATENT DOCUMENTS

| 6,697,270 B1 | 2/2004 | Kalman et al. |
| 9,263,778 B2 * | 2/2016 | Han ..................... H05B 1/0236 |

(Continued)

FOREIGN PATENT DOCUMENTS

| CN | 104242289 A | 12/2014 |
| CN | 204794584 U | 11/2015 |

(Continued)

OTHER PUBLICATIONS

Liao Xiaozhong, Liu Xiandhong, "Automatic Control System", Jun. 30, 2005, Beijing Institute of Technology Press, pp. 280 and 281. Partial English Translation.

*Primary Examiner* — Bickey Dhakal
(74) *Attorney, Agent, or Firm* — The Webb Law Firm

(57) ABSTRACT

The present patent application relates to a high-voltage motor vehicle electrical system comprising an electrical heating device and at least on further consumer during switching on of which, undesired electromagnetic oscillations may occur in the electrical system. According to the invention, these are suppressed by initially switching on the heating device, before the further consumer is switched on. Switching on the heating device changes the complete impedance of the electrical system such that a resonant enhancement of the interference oscillations is prevented. Preferably, the heating device is switched on only as shortly as possible (only during the switching on process of the further consumer) in order to minimize an undesired heating.

13 Claims, 5 Drawing Sheets

(51) Int. Cl.
    *H02J 1/02*         (2006.01)
    *B60L 1/08*         (2006.01)
    *B60L 58/10*        (2019.01)
    *B60H 1/22*        (2006.01)
    *B60L 58/24*        (2019.01)
    *B60L 50/75*        (2019.01)

(52) U.S. Cl.
    CPC ................ *B60L 1/08* (2013.01); *B60L 50/75* (2019.02); *B60L 58/10* (2019.02); *B60L 58/24* (2019.02); *H02J 1/02* (2013.01); *B60H 2001/2253* (2013.01); *B60L 2240/427* (2013.01); *B60L 2240/429* (2013.01); *B60L 2270/147* (2013.01); *Y02T 10/64* (2013.01); *Y02T 10/70* (2013.01)

(56) References Cited

U.S. PATENT DOCUMENTS

| | | | |
|---|---|---|---|
| 10,038,330 B2 * | 7/2018 | Klemm | ................ H02J 7/0068 |
| 2014/0035525 A1 | 2/2014 | Vossberg et al. | |

FOREIGN PATENT DOCUMENTS

| | | | | |
|---|---|---|---|---|
| CN | 102834287 | A | 12/2019 | |
| DE | 4133901 | A1 | 4/1993 | |
| DE | 102008027062 | A1 | 12/2009 | |
| DE | 102014209267 | A1 | 11/2015 | |
| GB | 2523197 | A | 8/2015 | |
| GB | 2519653 | B | 1/2016 | |
| GB | 2550661 | A * | 11/2017 | ................ H02J 1/14 |

* cited by examiner

HIGH-VOLTAGE MOTOR VEHICLE ELECTRICAL SYSTEM

CROSS-REFERENCE TO RELATED APPLICATION

This application claims priority to German Patent Application No. 10 2016 218 276.5 filed Sep. 22, 2016, the disclosure of which is hereby incorporated in its entirety by reference.

BACKGROUND OF THE INVENTION

Field of the Invention

The present invention relates to a motor vehicle electrical system. In particular, the invention relates to a high-voltage motor vehicle electrical system as it is, for example, used for vehicles with an electric drive, thus, hybrid vehicles or mere electric vehicles.

Description of Related Art

Generally, a motor vehicle electrical system serves for supplying a plurality of consumers, control devices, and signal components in a motor vehicle with power. The power is taken either from a battery as energy storage or from a generator (dynamo) when the motor vehicle engine is in operation. A plurality of individual consumers (electric motor vehicle components) can be supplied with power from the motor vehicle electrical system by means of relays or an electronic power distributor with semiconductor switches via individual load circuits.

Conventional motor vehicle electrical systems are based on a battery voltage of 12 V.

A special situation results in vehicles with electric drive (electric and hybrid vehicles) in which the battery (accumulator) does not only serve for the power supply of the conventional electrical vehicle components but in addition also have to provide traction power. In said vehicles, generally, motor vehicle electrical systems for applications in the high-voltage range of automotive engineering are common. One decisive advantage of a higher voltage is that the power needed for high performances is significantly lower than in a conventional 12 V electrical system.

The high-voltage range of automotive engineering is to be generally understood as being the range above 60 V direct current (or 25 V alternating current). Regarding electric and hybrid vehicles, in particular electrical system voltages in the range of 150 to 500 V (e.g. 300 V, 380 V or 420 V) are common. Said voltages are adequate for electric vehicles with drives up to approximately 100 kW and allow the use of broadly available 600 V power semiconductors. In case of higher driving powers as in sports cars or commercial vehicles, also even higher voltages, for example in the range of 650 V to 800 V can be used which, however, then require the use of specific power semiconductors in the power electronics comprising a blocking capacity of at least 1200 V.

However, motor vehicle electrical systems are also not uncomplicated, in particular in view of electromagnetic interferences arising due to the use of a plurality of switching components for switching considerable electrical powers (electromagnetic compatibility—EMC). These components generally use modules of power electronics on the basis of power semiconductors. For minimizing electrical and thermal losses, the switching processes occur possibly quickly and with steep clock pulse edges. However, this results in partially high-frequency transient interferences which may have a negative impact to the automotive electronics. On the other hand, in certain cases when a consumer is switched on, undesired electromagnetic oscillations may occur in the electrical system which depending on the impedance situation in the electrical system may be enhanced under conditions of electromagnetic resonance.

SUMMARY OF THE INVENTION

It is an object of the present invention to prevent or minimize undesired electromagnetic oscillations caused by transient interferences in a high-voltage motor vehicle electrical system.

According to a first aspect of the present invention, a high-voltage motor vehicle electrical system is provided. The high-voltage motor vehicle electrical system comprises at least one first load, a second load and a control device. The first load and the second load can be individually switched on. The second load comprises a heating device the switching on of which changes the impedance of the motor vehicle electrical system such that switching on of the second load before switching on the first load prevents the formation of electromagnetic oscillations in the motor vehicle electrical system when switching on the first load. The control device is configured to switch on the second load before switching on the first load, respectively.

According to a second aspect of the present invention, a method for operating a high-voltage motor vehicle electrical system is provided. The high-voltage motor vehicle electrical system comprises at least a first load which can be individually switched on and a second load which can be individually switched on. The second load comprises an electric heating device the switching on of which changes the impedance of the motor vehicle electrical system such that switching on the second load before switching on the first load prevents the formation of electromagnetic oscillations in the motor vehicle electrical system when switching on the first load. The method comprises the steps of switching on the first load and switching on the second load before switching on the first load.

It is the particular approach of the present invention to prevent the formation and enhancement of undesired electromagnetic oscillations in a high-voltage (HV) motor vehicle electrical system by means of common circuitry measures without additional electrical system components being necessary. Said oscillations in particular occur when switching on specific consumers (devices) in the vehicle electrical system, if the impedance situation leads to an enhancement of the oscillations due to a resonance. For their prevention, the fact is used according to the invention that switching on a further consumer shifts the impedance situation in the electrical system and, thus, no more undesired resonance or stronger attenuation occurs. If it is known that switching on a certain device in the electrical system triggers an oscillation, thus, according to the invention, the electric high-voltage motor vehicle heating is temporarily switched on (for a few seconds) directly before (for example, half a second) switching on the device causing the interference so that switching on of another device can no longer trigger oscillations in the electrical system. The heater anyway being a present electrical system component is thus temporarily used for a completely different purpose according to the invention, namely for shifting the overall impedance and for protecting the electrical system against interferences.

An electric high-voltage motor vehicle electrical system may comprise a whole string of components (consumers) which can cause the undesired interfering oscillations. Of course, these are primarily the high-capacity engines (traction motors) required for driving the vehicle or the power electronics components required for their control. In particular, the traction motors are often connected to the electrical system via pulse-controlled inverters the semiconductor components of which switch by means of possible steep clock pulse edges in order to minimize thermal losses. Further possible interfering components in the electrical system, for example, may be a fan drive, the drive of the compressor of the air conditioner, a water pump or oil pump, or, however, other auxiliary units. Further, in addition to the high-voltage electrical system, often also a conventional 12 V electrical system is maintained for certain electric/electronic components in order to be able to further use the conventional 12 V (volt) control electronics for said components. This 12 V electrical system, however, has to be galvanically isolated from the high-voltage electrical system for which DC/DC converters are used which for their part may be the reason for interferences (electrical system interferences, EMC interferences). A DC/DC converter can also be required in order to connect a fuel cell which may be present in the high-voltage electrical system.

According to an embodiment of the present invention, the first load comprises an electric traction motor of the motor vehicle and associated power electronics.

According to another embodiment of the present invention, the first load comprises a pulse-controlled inverter Switching on the heating only occurs temporarily but at least for the duration of a switching on process of the first load. Since, as a general rule, it is assumed that the heating at the moment of switching on the interfering device is currently not required for its actual purpose of increasing the temperature of the passenger compartment, it should only be switched on as shortly as possible in order not to emit noticeable heating power. On the other hand, switching on has to occur for a sufficient period of time in order to bridge the short transient phase (transient phase during which the electrical voltage/power supplied to the first load rises from zero to an usual normal value in the switched-on state) when switching on the other device during which the interfering oscillations arise. The transient phase, as a rule, has a duration of only a few seconds. Thus, switching on the heating occurs for a time period of some seconds, in particular less than 10 seconds or further preferably, less than 5 seconds. Of course, principally, also a longer switching on phase is feasible, if this is possible and useful in the individual case.

According to the invention, switching on the first load occurs with a certain delay vis-à-vis the instruction for switching on which can be given depending on the kind of the first load, for example, by a user or, however, also automatically in operation by another electrical system component. For this, the control device is configured such that when receiving an instruction for switching on the first load, it does not immediately carry out this instruction but initially issues a signal for switching on the second load. This is then switched on and only after switching on, the delayed switching on of the first load occurs. Thus, it is ensured that the first load is switched on only after the desired modification of the impedance of the electrical system. The decisive period of time of the delay is shorter than the period of time of switching on the heating as a whole and is in the range of less than one second, for example half a second.

A motor vehicle heating device used according to the invention can comprise several heating stages (heating circuits) which, as a rule, can be switched on separately. Since these heating stages often correspond to different power stages, have a different impedance and, thus, also in case of switching on, cause different modifications of the overall impedance of the electrical system, in case of a heating device with several heating stages, preferably, a previously determined specific heating stage as being the second load, is switched on. Since the interference components are often components with high power and high impedances, in certain embodiments, this is the available heating stage with the highest capacity.

Moreover, it is also feasible to utilize the presence of several heating stages with different powers/impedances to that effect that different heating stages can be used in order to suppress the interfering oscillations occurring when switching on various consumers with different impedances. According to one embodiment, in addition to the first and the second load, the motor vehicle electrical system has a third load which similar to the first load causes undesired electromagnetic oscillations when it is switched on, and the heating device has several heating stages of different power. Thereby, in each case before the first and the third load are switched on, a different one of the heating stages is temporarily switched on as a respective second load.

BRIEF DESCRIPTION OF THE DRAWINGS

In the following, the present invention is described by means of exemplary embodiments in connection with the attached drawings in which

FIG. 5 shows a flowchart of a method according to the invention when a consumer (first load) is switched on.

DESCRIPTION OF THE INVENTION

The subsequent detailed description serves to illustrate the invention by means of selected embodiments and with reference to the drawings. The present invention as defined in the claims, however, is not limited to the subsequently described embodiments and, in particular, to the parameter values exemplarily mentioned therein.

It is known that in high-voltage motor vehicle electrical systems problems may arise with undesired electromagnetic oscillations in the network which, in particular, occur when certain consumers are switched on, if the impedance situation in the electrical system causes an enhancement of oscillation due to resonance occurring during switching in switch elements. Said oscillations may occur when various components of a high-voltage electrical system are switched on. In particular, switching on a vehicle heating or individual elements (heating stages) of the vehicle heating causes a change of impedance in the electrical system.

The present invention utilizes this fact in order to prevent or at least minimize oscillations which may occur when electrical system components are switched on. Knowing that switching on the heating or a certain heating stage leads to a change of impedance, the same can thus be utilized in order to change the impedance of the electrical system before switching on another electrical system component such that switching on the other electrical system component can no longer trigger oscillations in the electrical system. For this purpose, the heating device is switched on immediately before switching on the interfering electrical system component. The heating device is thus temporarily utilized in the electrical system for a completely different purpose independently of heating.

Figure 1:
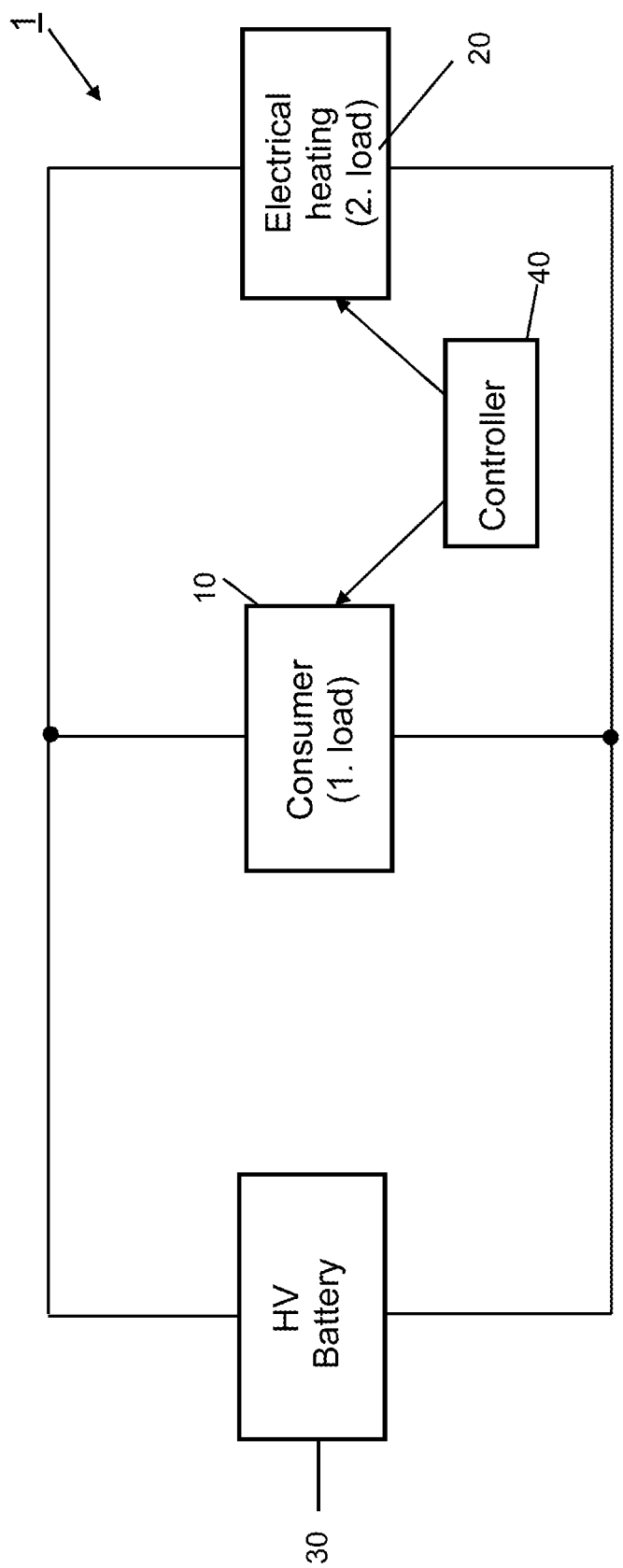
FIG. 1 shows a general overview of the vehicle electrical system according to the invention.

FIG. 1 provides a simplified overview of the essential elements of a high-voltage motor vehicle electrical system 1 in which the present invention may be used. The motor vehicle electrical system has at least two consumers (loads). In particular, a first consumer (first load) 10 is shown during switching on of which undesired oscillations occur in the electrical system. The second load 20 is an electrical heating which according to the invention is used for preventing the undesired oscillations. Furthermore, a high-voltage battery 30 is shown which supplies the complete electrical system with power. A control device (controller) 40 controls the switching operations required in the electrical system.

Figure 2:
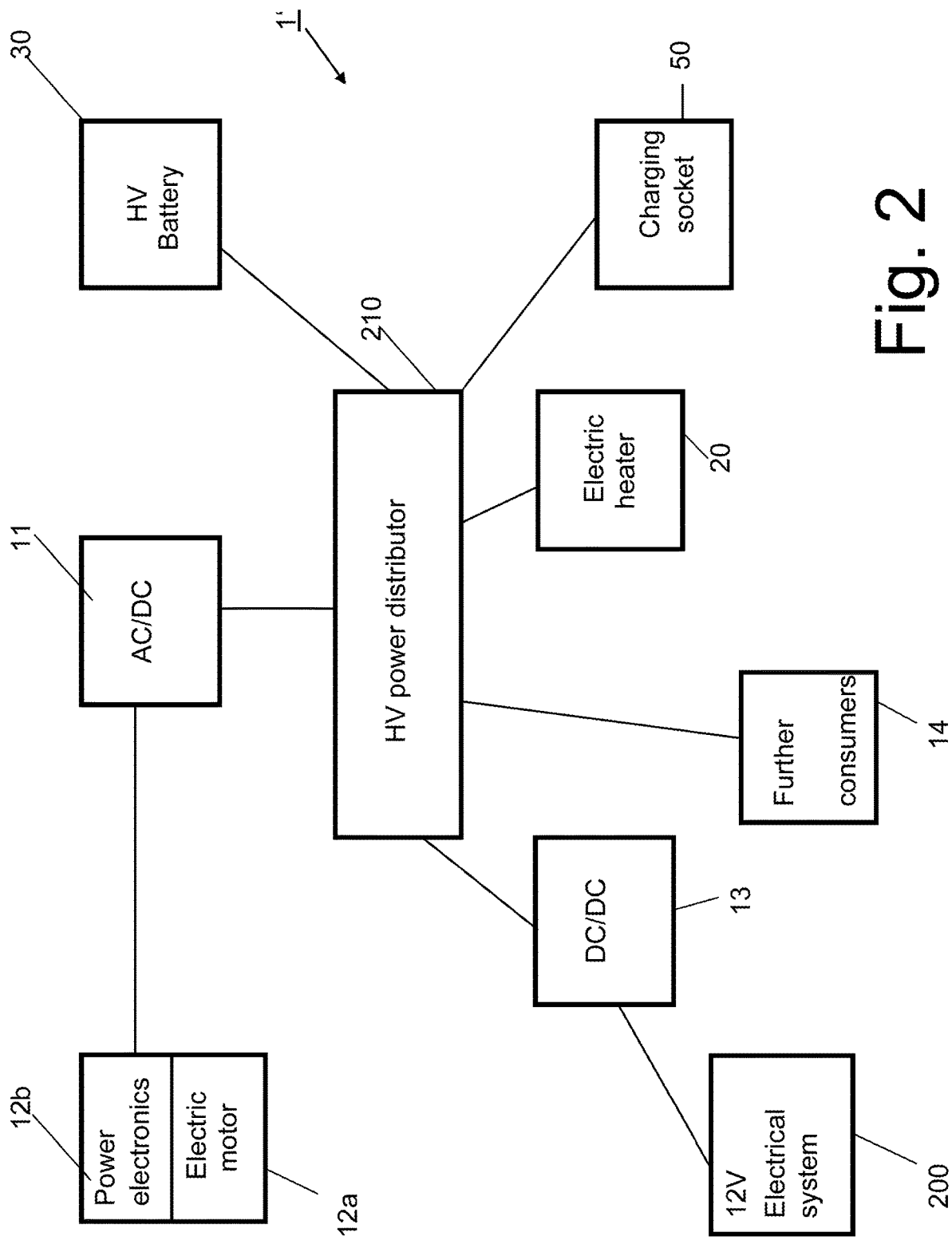
FIG. 2 is an exemplary illustration of components of an electrical system according to embodiments.

A detailed illustration of possible components of an exemplary high-voltage motor vehicle electrical system 1' is shown in FIG. 2.

In addition to the high-voltage battery 30 and the electrical heating device (second load) 20, a whole range of exemplary devices is shown switching on of which may lead to oscillations in the electrical system and which therefore can be considered being examples for a first load 10.

The most important component in a vehicle with electric drive is an electric motor for driving the vehicle (traction motor) 12a. For controlling the same, corresponding power electronics 12b is provided. Since the traction motor 12a operates with alternating current, the high-voltage battery 30, however, provides direct current, the motor is connected to the alternating current via an inverter (AC/DC) 11. For this purpose, usually pulse-controlled inverters are used. In the common use of three-phase motors, a frequency converter (FC) is required which at the input side is operated with one phase and at the output side with three phases, and which likewise constitutes an interference source.

The exemplary electrical system of FIG. 2 further has a DC/DC converter 13 via which a galvanically isolated conventional 12 V electrical system 200 is connected to the high-voltage electrical system 1'. Further consumers are cumulated in block 14. Said consumers, for example, may be an electrical air condition compressor, a fan for cooling/ventilation, a wiper motor, a water pump or an oil pump or other auxiliary units.

The HV power distributor 210 constitutes a central component for distributing the power in the high-voltage electrical system. This is used for the power supply of the auxiliary units connected to the high-voltage electrical system. The current distribution/power distribution may occur via a HV bus system (not shown). A charging socket 50 is likewise connected to the HV power distributor 210 via a corresponding charging device, which is not shown in the Figure. The controller 40 shown in FIG. 1 can be integrated in the HV power distributor 210 or may also be configured as separate component.

Vehicles in which the traction power is provided via a fuel cell, also have an HV electrical system. In this case, a fuel cell stack is present constituting a further electrical system component which is connected to the HV bus or the HV power distributor 210, for example, via a further DC/DC converter.

Figure 3:
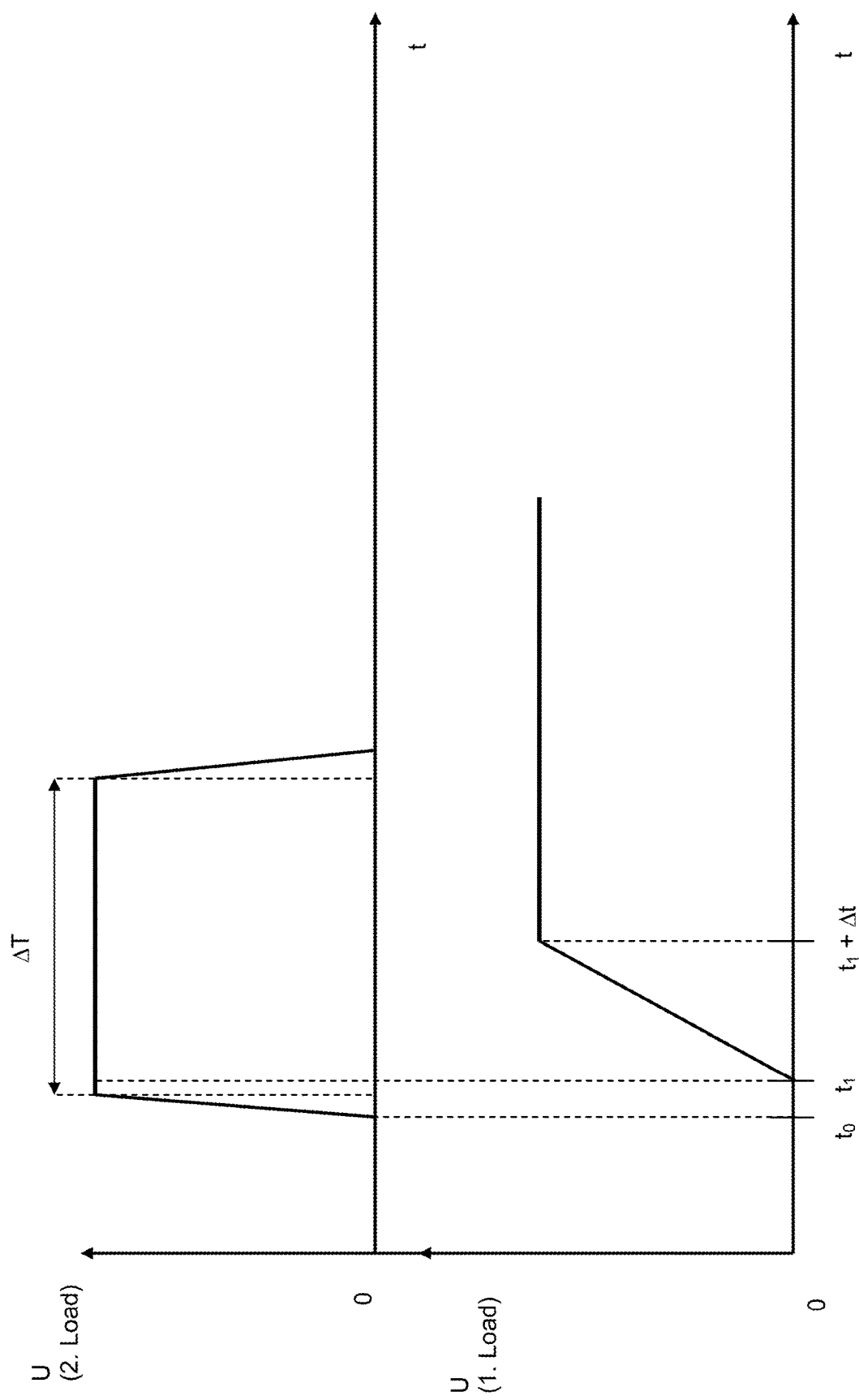
FIG. 3 is a schematic illustration of the lapse of time when a heating device is temporarily switched on as second load before switching on a different consumer (first load)

FIG. 3 shows a diagram of the lapse of time when a consumer (first load) 10 is switched on, wherein the occurrence of interference oscillations is supposed to be prevented according to the invention.

In the lower diagram, the lapse of time of switching on the consumer (first load) 10 is shown and in the upper diagram the respective lapse of time for the second load 20 (the heating device) is shown. Both diagrams have a joint time axis (the horizontal axis t). In the vertical direction, the course of a relevant size for the respective load, for example, the applied voltage U is shown. It is to be noted that in the diagrams of FIG. 3, only the chronological sequence is relevant. The magnitude of the illustrated voltage values depends on the kind of the loads. In particular, the Figure does not show a true to scale illustration of the voltage at the first load (bottom) and the second load (top).

In the case shown in the diagrams, it is assumed that at the time $t_0$ a control instruction to switch on the first load 10 is issued to the control device 40. This control instruction, however, according to the invention is not immediately, i.e. promptly carried out. The control device 40 after receipt of the control instruction to switch on the first load 10, rather for its part initially generates an instruction for temporarily switch on the second load (heating device) 20. This is sent to the power electronics for controlling the heating device and the heating device is switched on (the period of time from receiving the instruction for switching on the first load until the beginning of switching on the second load is ignored in the diagram). In the illustrated example, it is assumed that this switching on process is completed at a time $t_1$. Therefore, at the time $t_1$, switching on of the first load 10 is carried out by the control device 40. In other words, the instruction for switching on the first load 10 received at the time $t_0$ is carried out temporally delayed at the time $t_1$. At this time, the heating device 20 is already switched on, whereby the impedance of the electrical system had been changed such that there is no longer existing a resonance for the oscillations occurring when the first load 10 is switched on. The process of switching on itself does not occur momentarily but also requires a certain period of time ($\Delta t$). As shown in the diagram, it is, thus, assumed that the process of switching on the first load is completed at the time $t_1+\Delta t$. When the heating device is controlled, it is to be noted that this remains switched on at least until the process of switching on the load 10 is completed. The time period of switching on $\Delta T$ of the heating device 20 shown in the upper diagram, therefore, has to be longer than the period of time $\Delta t$ required for switching on the first load 10. On the other hand, switching on the heating 20 of course should occur as shortly as possible in order to prevent undesired heating. However, only temporally switching on the heating 20 is not essential for the present invention. It only constitutes a comfort feature.

According to an embodiment, a further instruction is issued to the heating device for switching off the heating (at the time $t_1+\Delta T$) by the control device 40. Alternatively, it would also be feasible that the control device 40 issues a specific instruction for only temporarily switching on the heating device 20. The period of time ($\Delta T$) of said temporary switching on of the heating would then be stored in the trigger circuit of the heating device 20 itself and the heating device 20 would be again switched off from its side without a further instruction of the control device 40 after the duration of switching on $\Delta T$ has been lapsed.

The duration of the switching on period $\Delta T$ as well as the time delay $t_1-t_0$ when the first load 10 is switched on, of course, depends on the circumstances, in particular on the kind of the first load 10 and of the design of the heating device 20. As a rule, however, it is to be assumed that a switching on period in the range of some seconds or below (e.g. between 10 ms (milliseconds) and 10 s (seconds)) is sufficient or the time delay when the consumer (first load 10) is switched on even amounts to only fractions of a second (for example is in the range of 100 μs (microseconds) to 500 ms), thus, is insignificant for the user. In an example, switching on an air condition compressor (first load) is delayed about 100 ms, i.e. the second load (heating device or a specific heating stage) is switched on before the air condition compressor. After 2 s it is switched off again.

Electrical heating devices for motor vehicles considerably differ in their design. While electrical heating systems in conventional motor vehicles were primarily used as auxiliary heaters (while a majority of the required heat was provided as lost heat of a combustion motor), in vehicles with electric drive, heating occurs exclusively electrically. To provide the heat, so-called PTC (positive temperature coefficient) heating elements are often used. These are self-regulating, since they offer a higher resistance with increasing heating and, thus, let through a smaller amount of current at the same voltage. The self-regulating properties of the PTC heating elements, thus, prevent overheating.

The air in the passenger compartment is heated by means of the PTC resistance heating elements either directly (air heating) or indirectly via a hot water circuit in which hot water flows though radiators (hot water heating). In the first case, thus, air is used, in the second, water is used as heat carrier.

When controlling motor vehicle heating systems, it is desirable to control an electrical heating device such that the heating power is adapted as precisely as possible to a power demand. Thereby, existing power reserves in the electrical system can be optimally utilized. This in particular applies to vehicles with electric drive in which the energy for the vehicle drive and the electric heating is supplied from the same source.

Therefore, motor vehicle heating systems are used with a plurality of separately controllable heating stages (heating circuits) each of which may comprise one or more heating elements (for example PTC resistance heating elements). In this case, heating stages of different power may be particularly used in order to be able to adjust variable heating powers as flexibly as possible by combining respective heating stages.

Since heating stages of different power influence the electrical system with different impedances, in such a case, not all heating stages are equally suitable for preventing the spreading of undesired oscillations by detuning the resonance. Rather, a predetermined heating stage is used the impedance of which is suitable for suppressing the interference oscillations. In view of the high performance of many components in the HV electrical system, this is often the heating stage with the highest power ("highest heating stage").

However, it is also feasible to use different heating stages with different impedances according to the invention for the purpose of interference suppression when several consumers are switched on. Thereby, respective heating stages or their combinations are assigned to individual consumers and their temporary switching on by respective instructions is prompted. This allows to react flexibly to the requirements of various vehicle platforms. For example, with 3 heating stages of different impedance $2^3-1=7$ different possibilities are obtained to influence the impedance and, thus, also the attenuation in the HV electrical system.

Another concept of a flexible adjustment of the heating power is based on the fact that the heating power can be continuously adjusted. This, in particular, occurs via pulse width modulation (PWM). For the benefit of a simple assembly and in order to minimize massively occurring electromagnetic interferences in the pulse width modulation for its part, in particular in the higher power range, in this case only one single heating stage (low overall power) is configured as being continuously adjustable via PWM. This heating stage, thus, serves for the fine adjustment of the heating power. The other heating stages are only switchable in a binary mode, thus, they are either switched off or emit the full heating power. Only said heating stages being binary switchable are suitable as second load according to the invention.

Figure 4:
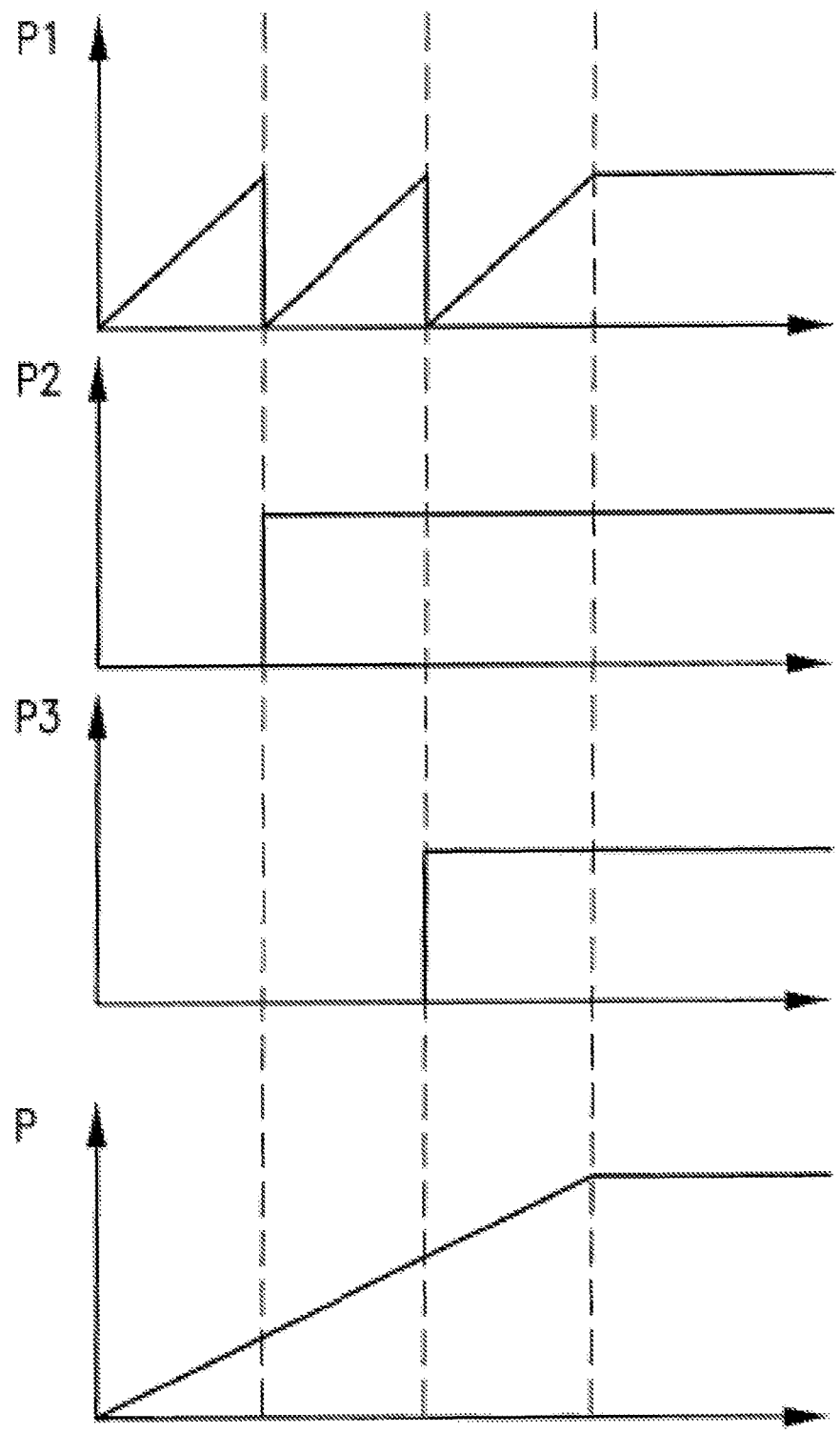
FIG. 4 is a diagram illustrating switching on an exemplary multi-stage motor vehicle heating.

The above described concept of controlling a heating with several heating stages from which only one can be continuously adjusted is shown in FIG. 4.

In FIG. 4, power timing diagrams for three heating stages (P1, P2, P3) are shown. While the power of stage P1 is continuously adjustable by PWM, the heating stages P2 and P3 can only be switched in the binary mode, between 0 and 100% of power. In the illustrated example, the power of the first heating stage (P1) is continuously increased from 0 to a maximum power of the heating stage. Subsequently, the second heating stage (P2) is switched on, the power of the first heating stage (P1) simultaneously declines again to 0 and is then once again increased up to the maximum power. Finally, the corresponding procedure is repeated with the third heating stage (P3). The upper diagram shows the continuous adjustment of the first heating stage from 0 to the maximum power which occurs sequentially without switching on a further heating stage and after switching on only the second, or the second and the third heating stage. The two diagrams in the middle show the corresponding delayed switching on of the second and third heating stage. In the lower diagram, the development of the complete heating power P (no true to scale illustration) is shown. In the illustrated example, all three heating stages have the same maximum heating power. As shown in the lower diagram, this allows a continuous adjustment of the complete heating power.

Figure 5:
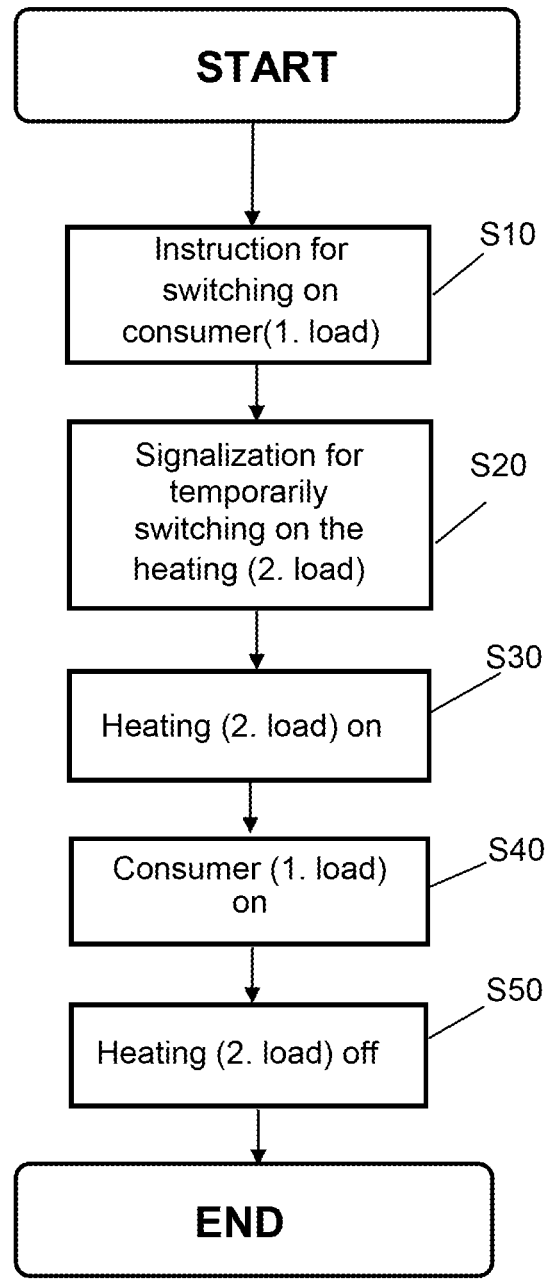

In FIG. 5, a flowchart for an operating method of a high-voltage motor vehicle electrical system according to the invention is shown.

In a first step (S10), the control device 40 obtains an instruction for switching on a consumer (first load 10). Depending on the kind of the first load, this may be an instruction which has been manually entered by a user (driver) as well as an instruction received via a vehicle bus from a different electrical system component.

The control device 40 determines by means of information stored there that when the first load 10 is switched on, undesired interference oscillations can be expected in the electrical system. Therefore, it delays the execution of the switching on instruction. Initially, the control device 40 issues an instruction for temporarily switching on a heating device (motor vehicle heating as a whole or a predetermined heating stage of appropriate impedance) as second load 20 to the control circuit of the heating device (step S20).

In the subsequent step S30, the control circuit receives the instruction and switches on the heating device. With a corresponding delay which ensures that the heating device had been switched on, the control device 40, then in step S40, switches on the first load 10. The exemplarily indicated method sequence ends with newly switching off the heating device 20 in step S50. As already described in connection with FIG. 3, the period of time of switching on may already be coded in the instruction for switching on from the control device 40 or, however, at a suitable time, a separate instruction for switching off the heating device 20 is generated by the control device 40 and transmitted to the control circuit of the heating device 20.

For the sake of completeness, it is emphasized that the controlling concept according to the invention is not limited to the fact that a heating device is temporarily switched on as a second load. It is rather also feasible to switch on another suitable consumer in the high-voltage motor vehicle electrical system in order to suppress interference oscillations occurring when the first load is switched on.

In summary, the present patent application relates to a high-voltage motor vehicle electrical system with an electrical heating and at least one further consumer during switching on of which undesired electromagnetic oscillations may occur in the electrical system. These are suppressed according to the invention by initially switching on the heating device before the further consumer is switched on. Switching on the heating device changes the overall impedance of the electrical system such that a resonant enhancement of the interference oscillations is prevented. In some examples, the heating device is only switched on as shortly as possible (only during the switching on process of the further consumer) in order to minimize an undesired heating.

The invention claimed is:

1. A high-voltage motor vehicle electrical system comprising:
at least one first load, a second load, and a control device operatively connected to the at least one first load and the second load, wherein
the at least one first load and the second load can be individually switched on,
the second load comprises a heating device, the switching on of which changes the impedance of the motor vehicle electrical system such that switching on of the second load before switching on the at least one first load prevents formation of electromagnetic oscillations in the motor vehicle electrical system when switching on the at least one first load,
the control device is configured to switch on the second load before switching on the at least one first load, respectively,
the second load is switched off after the process of switching on the at least one first load has been completed, and
switching on the second load occurs for at least a duration of a switching process of the at least one first load.

2. The high-voltage motor vehicle electrical system according to claim 1, where-in the at least one first load comprises an electric traction motor of the motor vehicle and associated power electronics.

3. The high-voltage motor vehicle electrical system according to claim 1, where-in the at least one first load comprises a pulse-controlled inverter.

4. The high-voltage motor vehicle electrical system according to claim 1, where-in switching on the second load occurs for a period of time of less than 10 seconds.

5. The high-voltage motor vehicle electrical system according to claim 4, where-in switching on the second load occurs for a period of time of less than 5 seconds.

6. The high-voltage motor vehicle electrical system according to claim 1, where-in the control device is configured to initially output a signal for switching on the second load up-on an instruction for switching on the at least one first load and to delay execution of an instruction for switching on of the at least one first load until the second load has been switched on.

7. The high-voltage motor vehicle electrical system according to claim 1, where-in the heating device comprises several heating levels, one specific heating level of which is temporarily switched on as the second load before switching on the at least one first load.

8. The high-voltage motor vehicle electrical system according to claim 7 comprising a plurality of heating levels of different power, wherein the specific heating level constitutes the most powerful heating level.

9. The high-voltage motor vehicle electrical system according to claim 1, wherein the heating device comprises a plurality of heating levels of different power and further comprising a third load which can be individually switched on, wherein before switching on the at least first load and the third load, different heating stages are temporarily switched on, respectively.

10. A method for operating a high-voltage motor vehicle electrical system, where-in the high-voltage motor vehicle electrical system comprises at least one first load which can be individually switched on and a second load which can be individually switched on, the second load comprising an electric heating device the switching on of which changes the impedance of the motor vehicle electrical system such that switching on the second load before switching on the at least one first load prevents formation of electromagnetic oscillations in the motor vehicle electrical system when switching on the at least one first load, and the method comprising the steps:
switching on the at least one first load,
switching on the second load before switching on the at least one first load, and
switching the second load off after completing the process of switching on the at least one first load,
wherein switching on the second load occurs at least for the duration of a switching process of the at least one first load.

11. The method according to claim 10, wherein switching on the second load occurs for a period of time of less than 10 seconds.

12. The method according to claim 11, wherein switching on the second load occurs for a period of time of less than 5 seconds.

13. The method according to claim 10, further comprising the steps:
receiving a switching on instruction for the at least one first load, and
outputting a signal for switching on the second load after receiving the switching on instruction,
wherein executing the switching on instruction for the at least one first load occurs delayed after switching on the second load.

* * * * *

UNITED STATES PATENT AND TRADEMARK OFFICE
CERTIFICATE OF CORRECTION

| | |
|---|---|
| PATENT NO. | : 10,965,146 B2 |
| APPLICATION NO. | : 15/710882 |
| DATED | : March 30, 2021 |
| INVENTOR(S) | : Dimitar Tchobanov et al. |

It is certified that error appears in the above-identified patent and that said Letters Patent is hereby corrected as shown below:

On the Title Page

Column 1, Assignee, Line 1, after "KG" insert -- (DE) --

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*